United States Patent [19]

Kang

[11] Patent Number: 6,066,929
[45] Date of Patent: May 23, 2000

[54] FREQUENCY GENERATOR CIRCUIT FOR A BRUSHLESS DC MOTOR CONTROL SYSTEM

[75] Inventor: Nam-Jin Kang, Bucheon, Rep. of Korea

[73] Assignee: Fairchild Korea Semiconductor, Kyungki-do, Rep. of Korea

[21] Appl. No.: 09/316,553

[22] Filed: May 24, 1999

[30] Foreign Application Priority Data

May 22, 1998 [KR] Rep. of Korea ............... 98-18471

[51] Int. Cl.⁷ .................................................. H02K 23/00
[52] U.S. Cl. ..................... 318/254; 318/254; 318/138; 318/439; 318/560; 318/569; 318/594; 318/600; 318/601
[58] Field of Search ................................ 318/254, 439, 318/138, 560, 569, 594, 600, 601

[56] References Cited

U.S. PATENT DOCUMENTS

4,528,486  7/1985  Flaig et al. ............................ 318/254
5,466,997  11/1995  Utenick et al. ....................... 318/254
5,818,179  10/1998  Utenick et al. ....................... 318/254
5,998,946  12/1999  Kim ....................................... 318/254

Primary Examiner—Karen Masih
Attorney, Agent, or Firm—Marshall, O'Toole, Gerstein, Murray & Borun

[57] ABSTRACT

A brushless direct current motor driving circuit includes a data generator adapted to receive a first signal corresponding to a rotor position and to generate a digital data signal therefrom, a clock signal generator adapted to receive phase voltage signals and back electromotive force (BEMF) signals from a motor and to generate a clocking signal therefrom, and a data output block coupled to the data generator and the clock signal generator and adapted to receive the data signal and the clocking signal such that the digital data is clocked into the data output block as a result of the BEMF signals to produce a frequency signal to be used in controlling the velocity of the rotor. Switching noise present together with the BEMF signals is rejected by the clock signal generator so that the frequency signal is substantially free from switching noise, thereby allowing a velocity controller to provide more precise velocity control of the rotor.

15 Claims, 8 Drawing Sheets

FREQUENCY GENERATOR CIRCUIT FOR A BRUSHLESS DC MOTOR CONTROL SYSTEM

BACKGROUND OF THE INVENTION

1. Field of the Invention

The invention relates generally to a brushless direct current (BLDC) motor. More specifically, the invention relates to a frequency generator for a BLDC motor control system.

2. Description of Related Technology

Conventional 3-phase BLDC motors include three stator windings, commonly referred to as U, V, and W phases, and a rotor having main magnets and sub-magnets axially aligned about its circumference. The north and south poles of the main magnets alternate so that current pulses applied to the phase windings produce magnetic fields that cause torques on the rotor to rotate the motor shaft, and the sub-magnets are arranged on the rotor to enable constant velocity control of the BLDC motor. Typically, there are fewer sub-magnets than main magnets such that the ratio of sub-magnets to main magnets may be, for example, 1:3.

BLDC motors lack a traditional mechanical commutator to commutate (i.e., alternate) current in the phase windings to produce the alternating magnetic fields in the stator that are required to cause continuous rotation of the rotor and the motor shaft. Instead, BLDC motors use sensors such as Hall-effect devices, resolvers, and photo-encoders to determine the orientation of the magnetic fields of the rotor with respect to the stator phase windings, and electronic switches, such as transistors, to control the current flow through the phase windings.

To control the velocity of the rotor in a BLDC motor, an electronic controller unit is typically used to form a servo control loop that monitors the rotor velocity, compares the rotor velocity to a desired target velocity, and generates an error signal that controls the phase winding currents to correct the rotor velocity so that it remains substantially constant and equal to the desired target velocity. Typically, the controller determines the velocity of the rotor by measuring the period between the back electromotive force (BEMF) signals that are generated by each of the stator phase windings. However, this conventional use of BEMF signals to determine rotor velocity is problematic because BEMF signals are usually corrupted by switching noise. As a result of this noise, velocity measurements are inaccurate and the servo control loop does not accurately control the velocity of the rotor.

SUMMARY OF THE INVENTION

In accordance with one aspect of the invention, a brushless direct current motor driving circuit includes a data generator adapted to receive a first signal corresponding to a rotor position and to generate a digital data signal therefrom, a clock signal generator adapted to receive phase voltage signals and back electromotive force (BEMF) signals from a motor and to generate a clocking signal therefrom, and a data output block coupled to the data generator and the clock signal generator and adapted to receive the data signal and the clocking signal such that the digital data is clocked into the data output block as a result of the BEMF signals to produce a frequency signal to be used in controlling the velocity of the rotor.

In accordance with another aspect of the invention, a brushless direct current motor driving circuit, includes a neutral point generator adapted to receive phase voltages from a motor and to generate a neutral point voltage therefrom, and a comparator coupled to the neutral point generator and the motor and adapted to receive back electromotive force (BEMF) signals from the motor and further adapted to compare the BEMF signals to the neutral point voltage to produce a frequency signal to be used in controlling the velocity of a rotor in the motor.

The invention itself, together with further objects and attendant advantages, will best be understood by reference to the following detailed description, taken in conjunction with the accompanying drawings.

BRIEF DESCRIPTION OF THE DRAWINGS

FIGS. 4(*a*) and 4(*b*) illustrate signal waveforms associated with the embodiment shown in FIG. 3; and FIGS. 5(*a*)–5(*d*) illustrate actual measured signal waveforms associated with the embodiment shown in FIG. 3.

DETAILED DESCRIPTION OF THE PREFERRED EMBODIMENTS

Figure 1:
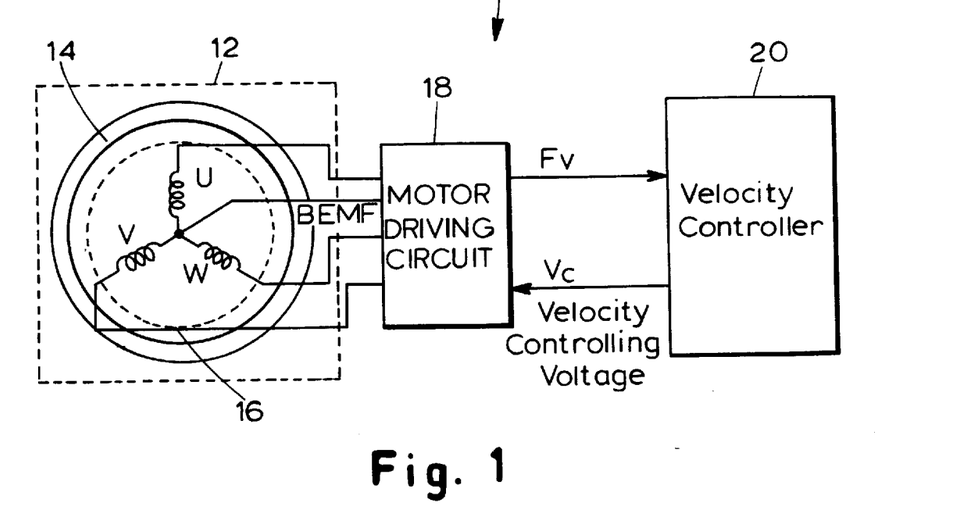
FIG. 1 illustrates a block diagram of motor control system embodying aspects of the invention.

FIG. 1 illustrates a block diagram of a motor control system 10 embodying aspects of the invention. The motor control system 10 includes a BLDC motor 12, having a rotor 14 and a stator 16, a motor driving circuit 18 coupled to three phase windings U, W, and V of the stator 16, and a velocity controller 20 in communication with the motor driving circuit 18.

In general, the motor driving circuit 18 receives signals from a sensor (not shown), such as a Hall-effect sensor, that indicates the orientation of the magnetic fields of the rotor 14 with respect to the phase windings of the stator 16, and provides commutation signals to each of the phase windings U, V, and W to continuously rotate the rotor 14. The motor driving circuit 18 also monitors the phase winding voltages and the BEMF signals of the motor 12 to provide a frequency signal (Fv), indicative of the velocity of the rotor 14, to the velocity controller 20.

The velocity controller 20 determines the velocity of the rotor 14 by, for example, measuring the period of Fv, compares the measured velocity to a predetermined target velocity, and provides a velocity controlling voltage (Vc) to the motor driving circuit 18. The motor driving circuit 18 is responsive to Vc such that the commutation signals supplied to the phase windings of the stator 16 are varied to maintain the velocity of the rotor 14 substantially equal to the predetermined target velocity. Those skilled in the art will appreciate that the velocity controller 20 completes a servo control loop, wherein the motor driving circuit 18 provides Fv as a rotor velocity feedback signal and the velocity controller provides Vc a corrective control signal to the motor driving circuit 18 so that the velocity of the rotor 14 is maintained substantially constant about the predetermined target velocity. It can also be appreciated by those of ordinary skill in the art that the velocity controller 20 may implemented using a microcontroller or microprocessor-based system executing a series of program steps, analog circuitry, or any combination of analog and digital circuitry without departing from the scope of the invention.

Figure 2:
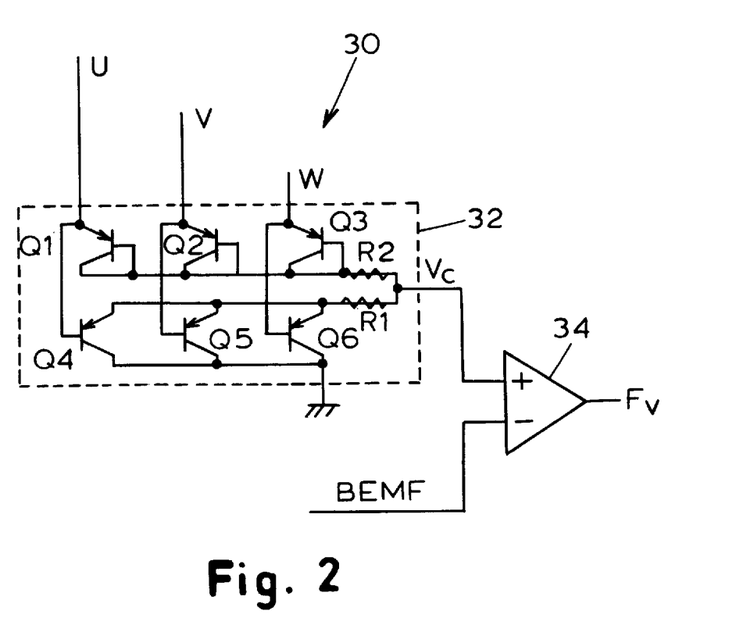
FIG. 2 illustrates a schematic diagram for a frequency generator according to one embodiment of the invention.

FIG. 2 illustrates schematic diagram for a frequency generator circuit 30 according to one embodiment of the invention that may be an integral portion of the motor driving circuit 18 shown in FIG. 1. The frequency generator circuit 30 includes a neutral point generator 32 that receives voltages from the three phase windings U, V, and W and generates a neutral point voltage Vn, and a comparator 34 that receives Vn on a non-inverting input terminal and compares it to the BEMF signals that are applied to an inverting input terminal of the comparator 34.

The neutral point generator 32 includes transistors Q1–Q6 and resistors R1 and R2, all connected as shown. Because the three phase voltages U, V, and W are controlled to sequentially alternate between a high level and low level condition, the neutral point generator 32 will generate a neutral point voltage equal to a portion of the phase voltages as a function of the ratio of resistors R1 and R2. For example, when the U phase voltage is at a high level and the V phase voltage is at a low level, transistors Q1 and Q5 will be ON so that the U phase voltage is applied across R1 and R2 to generate Vn according the ratio R1/(R1+R2). Preferably, the resistors R1 and R2 are selected to be the same value so that the ratio equals ½ and Vn is substantially equal to the voltage at the common node of the three phase windings.

In general, the neutral point detector 32 will provide the neutral point voltage Vn whenever at least one phase voltage is at a high level and at least one phase voltage is at a low level. Typically, the high/low phase pairs will occur in the conventional sequence UV, VW, WU, but other sequences may be possible without departing from the scope of the invention.

The comparator 34 compares Vn to the BEMF signals to generate the frequency signal Fv. The BEMF signals are generated as the magnets of the rotor 14 rotate past the phase windings U, V, and W. Thus, the output of the comparator 34 (i.e., the frequency signal Fv) will change from a high level output to a low level output when the BEMF signals exceed Vn, which is preferably one-half the phase voltage. The frequency output signal Fv is subsequently used by the velocity controller 20 to adjust the value of the velocity controlling voltage Vc to trim the velocity of the rotor 14.

Figure 3:
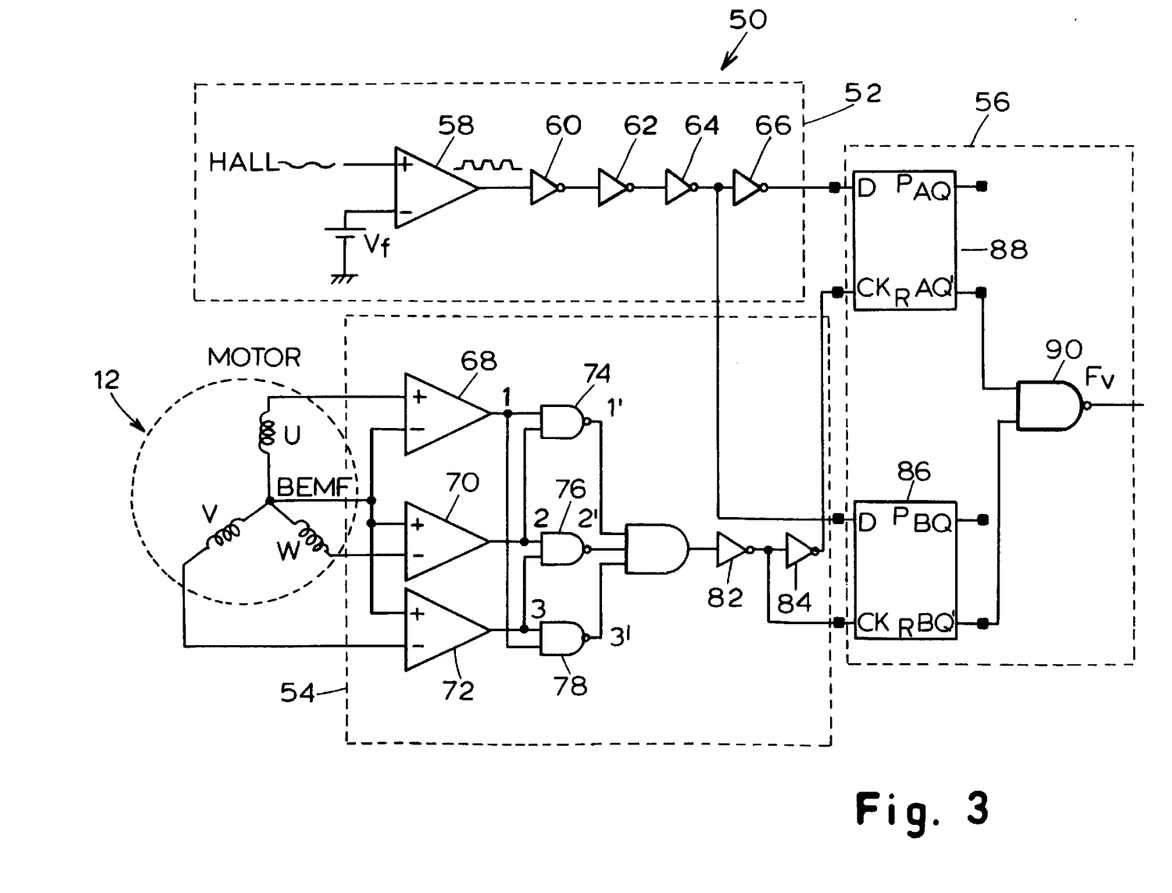
FIG. 3 illustrates a schematic diagram for a frequency generator according to another embodiment of the invention.

FIG. 3 illustrates a schematic diagram for a frequency generator circuit 50 according to another embodiment of the invention that may be an integral portion of the motor driving circuit 18 shown in FIG. 1. The frequency generator circuit 50 includes a data generator 52, a clock signal generator 54, and a data output block 56.

The data generator 52 includes a comparator 58, and inverters 60–66, all connected as shown. The data generator 52 receives an input signal from a Hall-effect sensor (not shown). The Hall-effect sensor produces a sinusoidal waveform (shown in FIG. 4a) that indicates the position of the rotor 14 with respect to the phase windings U, V, and W of the stator 16. The output of the Hall-effect sensor is applied to the non-inverting input terminal of the comparator 58, and is compared to a reference voltage Vf, which is preferably selected to be midway between the high and low voltage peaks of the sinusoidal waveform. Thus, the output of the comparator 58 is a zero-referenced square wave having a fifty-percent duty cycle (shown in FIG. 4a).

The zero-referenced square wave signal is passed through the first three inverters 60–64 before it is provided to the data register 56, and is passed through all four inverters 58–66 before it is provided to the data register 56. Generally, the inverters 58–66 provide a logic time-delay to compensate for logic time-delays in the clock signal generator 54.

The clock signal generator 54 includes comparators 68–72, NAND gates 74–78, AND gate 80, and first and second inverters 82, 84, all connected as shown. The non-inverting terminals of the comparators 68–72 are connected to the common node of the stator windings of the motor 12 to receive BEMF signals. The inverting terminals of the comparators 68–72 are connected to the phase voltages U, W, and V, respectively.

Figure 4A:
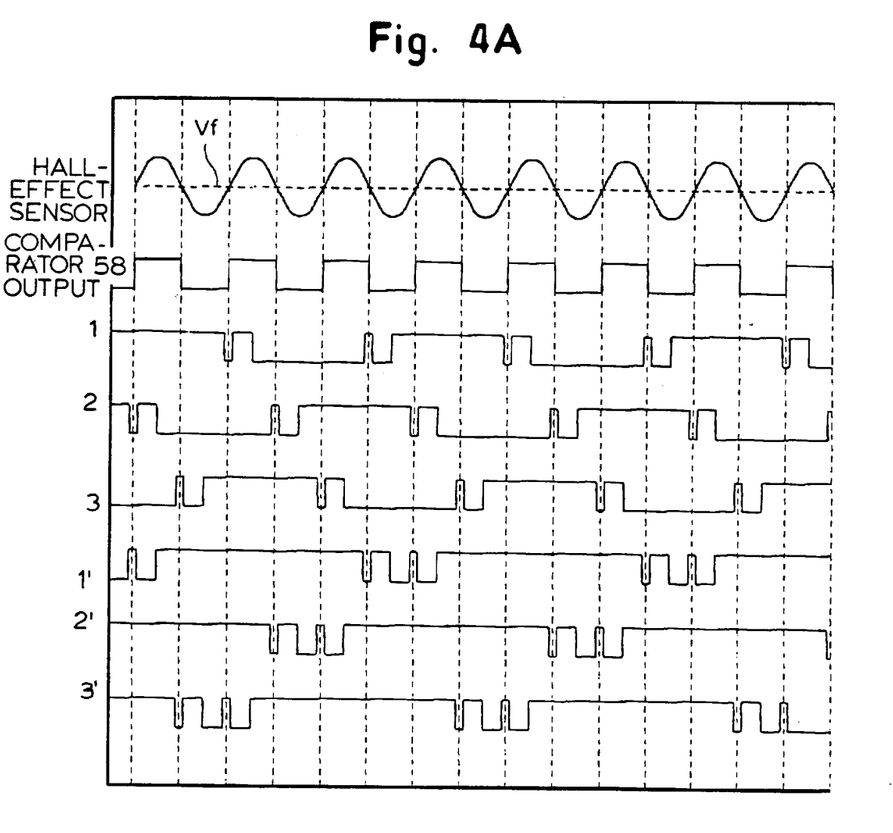
Figure 4B:
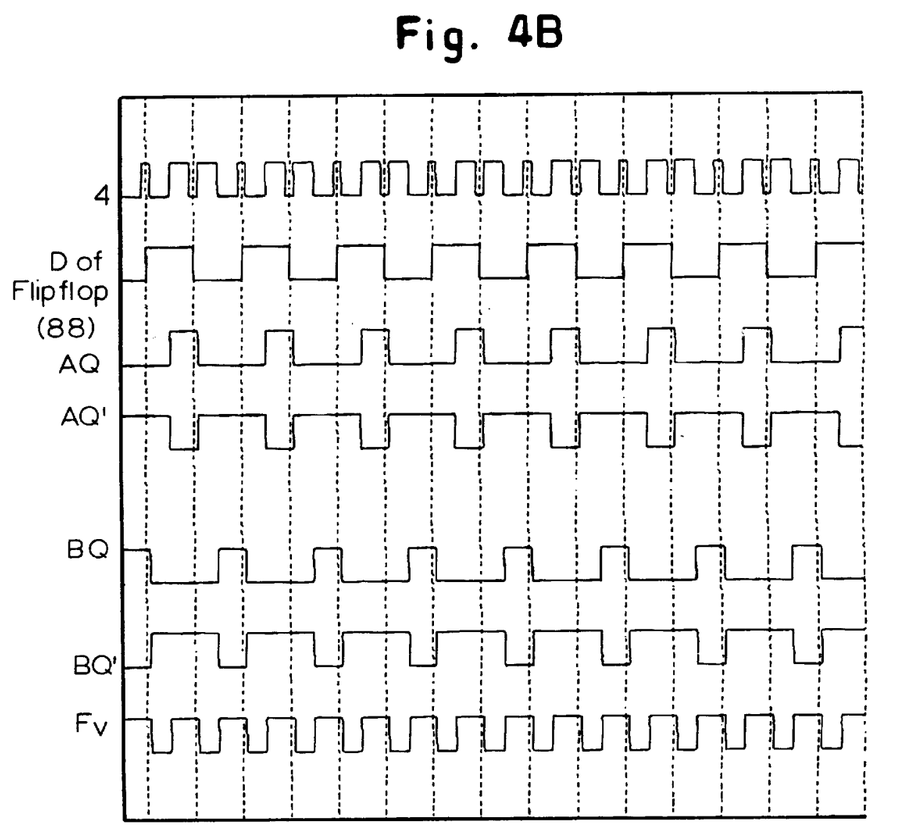
Figure 5A:
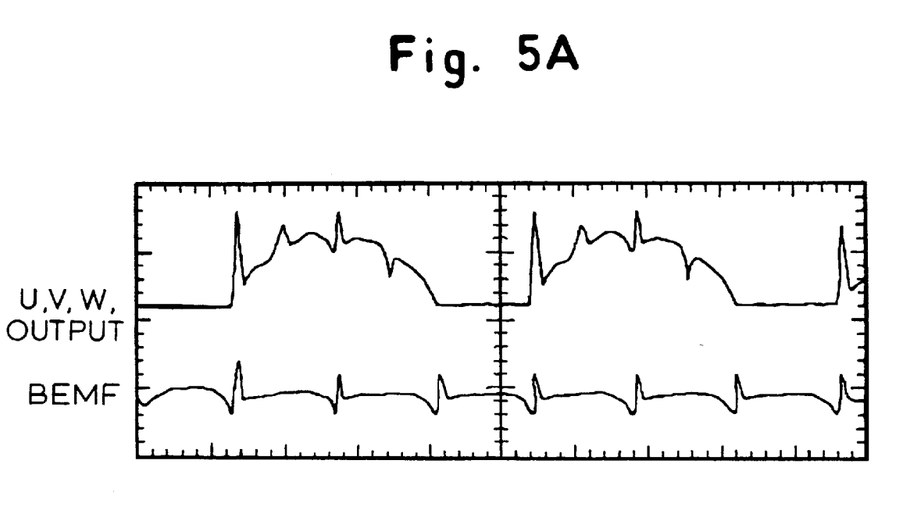
Figure 5B:
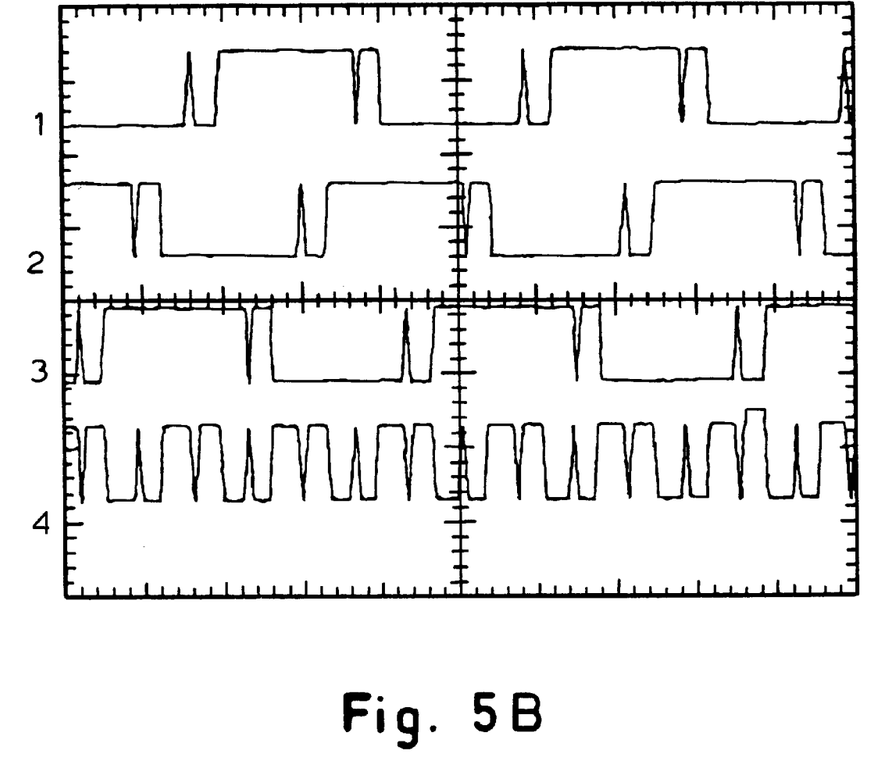
Figure 5C:
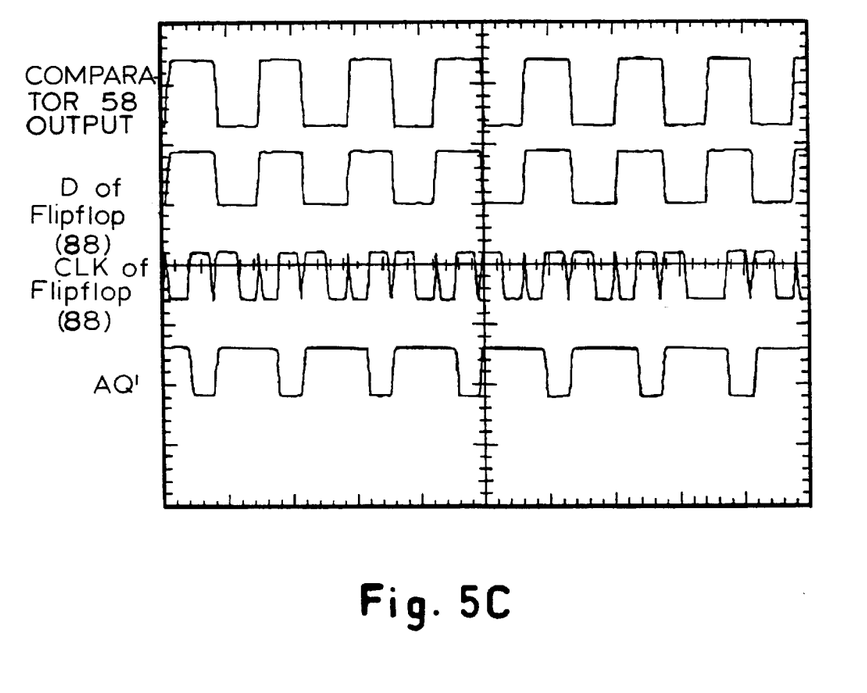
Figure 5D:
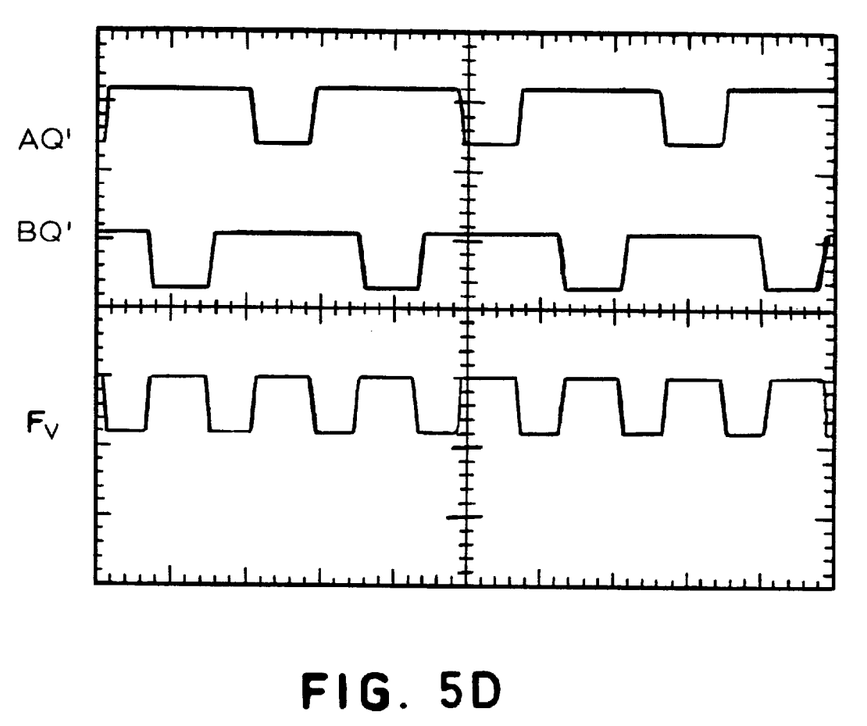

In operation, the clock signal generator 54 monitors the difference between the three phase voltages U, V, and W and the common node of the phase windings to cause state changes at the outputs of comparators 68–72 in response to the BEMF signals. Exemplary waveforms of the outputs of the comparators 68–72 are shown in FIG. 4a as waveforms "1," "2," and "3." Importantly, the output waveforms of the comparators 68–72 do not contain the spurious and switching noise signals that are typically together with the BEMF signals. The logic gates 74–80 combine the outputs of the comparators 68–72 to provide a clocking signal having the BEMF signals of all three phase windings. An exemplary clocking signal waveform is shown as waveform "4" in FIG. 4b.

The clocking signal waveform is subsequently passed though the first inverter 82 and then applied to the clock input of a first D-type flip-flop 86 in the data output block 56. The clocking signal waveform is also passed through both invertors 82, 84 in the clocking signal generator 54 and then applied to the clock input of a second D-type flip-flop 88 in the output data block 56. The clocking signal clocks the first and second flip-flops 86, 88 to latch the data received from the data generator 52 to the complemented outputs of the flip-flops 86, 88. The complemented outputs of the flip-flops 86, 88 are passed through NAND gate 90 to produce the frequency signal Fv.

Those skilled in the art will appreciate that any switching noise together with the BEMF signals is rejected by the comparators 68–72 and the logic gates 74–80 of the clock signal generator 54. As a result, the frequency signal Fv is substantially free from switching noise and the velocity controller 20 may accordingly provide more precise velocity control of the rotor 14 in the motor 12.

A range of changes and modifications can be made to the preferred embodiment described above. The foregoing detailed description should be regarded as illustrative rather than limiting and the following claims, including all equivalents, are intended to define the scope of the invention.

What is claimed is:

1. A brushless direct current (BLDC) motor driving circuit, comprising:
   a data generator adapted to receive a first signal corresponding to a rotor position and to generate a digital data signal therefrom,
   a clock signal generator adapted to receive phase voltage signals and back electromotive force (BEMF) signals from a motor and to generate a clocking signal therefrom; and
   a data output block coupled to the data generator and the clock signal generator and adapted to receive the data signal and the clocking signal such that the digital data is clocked into the data output block as a result of the BEMF signals to produce a frequency signal to be used in controlling the velocity of the rotor.

2. The circuit of claim 1, wherein the first signal is received from a Hall-effect sensor.

3. The circuit of claim 1, wherein the data generator compares the first signal to a predetermined reference voltage.

4. The circuit of claim 1, wherein the data generator comprises at least one comparator and at least one inverter in communication with the comparator.

5. The circuit of claim 1, wherein the clock signal generator comprises three comparators connected to the phase voltage signals so that the outputs of the comparators are responsive to the BEMF signals.

6. The circuit of claim 5, wherein the clock signal generator further comprises logic gates coupled to the comparator outputs and adapted to combine the comparator outputs to produce the clocking signal.

7. The circuit of claim 1, wherein the output data output block comprises at least two flip-flops.

8. The circuit of claim 7, wherein the flip-flops are D-type flip-flops.

9. The circuit of claim 7, wherein complementary outputs of the flip-flops are combined to form the frequency signal.

10. A brushless direct current (BLDC) motor driving circuit, comprising:

a neutral point generator adapted to receive phase voltages from a motor and to generate a neutral point voltage therefrom; and a comparator coupled to the neutral point generator and the motor and adapted to receive back electromotive force (BEMF) signals from the motor and further adapted to compare the BEMF signals to the neutral point voltage to produce a frequency signal to be used in controlling the velocity of a rotor in the motor.

11. The circuit of claim 10, wherein the neutral point generator comprises a plurality of transistors and resistors.

12. The circuit of claim 11, wherein three of the transistors are connected to provide a diode function and three of the transistors are connected in a common-emitter configuration to drive an input of the comparator.

13. The circuit of claim 10, wherein the neutral point generator is coupled to a non-inverting input of the comparator.

14. The circuit of claim 10, wherein a stator winding of the motor is coupled to an inverting input of the comparator.

15. The circuit of claim 10, wherein the neutral point voltage is about one-half of the phase voltages.

* * * * *